United States Patent [19]

Zajac

[11] Patent Number: 4,662,408

[45] Date of Patent: May 5, 1987

[54] ELECTRICAL CABLE ASSEMBLY APPARATUS AND METHOD

[76] Inventor: Rose Zajac, 1411 N. 37th Pl., Melrose Park, Ill. 60160

[21] Appl. No.: 154,912

[22] Filed: May 30, 1980

[51] Int. Cl.[4] ......................... B21F 3/00; B23P 19/00; H21R 43/00

[52] U.S. Cl. ..................................... 140/92.1; 29/872; 29/760

[58] Field of Search ...................... 140/91.1, 93, 71 R; 29/755, 760, 867, 825, 828, 868, 872; 174/72 A; 361/428

[56] References Cited

U.S. PATENT DOCUMENTS 485,236 11/1892 Chase ................................ 140/92.1
3,128,214 4/1964 Lay .................................. 174/72 A
3,633,096 1/1972 Bollman ............................ 140/92.1
3,842,496 10/1974 Mercer ................................. 29/867

*Primary Examiner*—Nicholas P. Godici
*Attorney, Agent, or Firm*—Frank R. Thienpont

[57] ABSTRACT

A plurality of precision cables simultaneously constructed on an assembly device having wire retainers arranged in a corresponding plurality of cable patterns. Each assembly step is successively performed on the plurality of substantially identical cable patterns before the next step is commenced to facilitate assembler efficiency. The precision electrical cables are assembled in a generally linear form with individual wire terminals intermediate their ends and with a selected amount of slack provided in at least some of the individual wires which is retained between cable bindings to permit subsequent bending of the cable between the bindings without substantial relative displacement of the individual wire terminals. The linear form facilitates both use of a tie gun for binding the wires of the cable together and compact mounting of a plurality of cable patterns on a single cable assembly apparatus.

9 Claims, 5 Drawing Figures

ELECTRICAL CABLE ASSEMBLY APPARATUS AND METHOD

BACKGROUND

1. Field of the Invention

The present invention relates to electrical, or insulated wire cables, of the type which have a plurality of terminal points along the length of the cable and are bent into precise selected forms to make connections with a plurality of electrical components in electronic or electromechanical devices, such as pinball machines, and methods and apparatus for assembling same.

2. Description of the Prior Art

Such precision electrical cables are used to make connections with numerous components located in a relatively small area of space around which the cable is routed. I am most familiar with the use of such cables to make connections on what is known as an "insert board" in a pinball machine but other applications exist. Such space limitations allow very little room for excess cable, and the location of the various bends and intermediate terminal points must be done precisely. Such cables are therefore referred to herein as precision cables.

The past method of assembling precision electrical cables that I know of has been to assemble them in their final bent form on an assembly device 10 of the type shown in FIGS. 1A and 1B which illustrate a cable assembly device for a cable to be utilized in a pinball machine.

Referring to FIG. 1A, an assembly device 10 comprises a flat board 11 placed on frame 13. A wiring pattern, or cable path 12, is designated on board 11 by a plurality of wire retainers 56 which may be nail-like members releasably mounted to and projecting from the board 11 at various points along pattern 12. A common starting point 14 is marked by one retainer 56. Other retainers 56 mark various breakout points 18 along cable path 16 and wire terminal points 15. Cable path 16 is in a generally square configuration, having three major bend points 17, 19 and 21 around which the cable path 16 is bent. During assembly, individual wire leads are broken out from the common cable path 16 at the breakout points 18 and terminate at terminal points 15. A paper pattern 54 corresponding to the wiring pattern 12 and containing wiring instructions may be held to board 11 by wire retainers 56.

Individual wires 24', such as 18 gauge insulated electrical wire, are hand drawn by an assembler from a wire supply board 20 as best seen in FIG. 1B. Individual wires 24' from spools 24 are drawn through holes 22 in board 20. Often a group or set of wires are drawn from wire supply board 20 and secured to the retainer 56 at starting point 14. Then, each individual wire 24' of the set is strung along cable path 16, around its respective breakout point 18 and secured at its respective terminal, or termination point 15. Several wires may share the same termination point 15.

After the first set of wires has been assembled, each individual wire 24' is cut at its terminal and the assembler ties them together and drops them back to supply board 20. Wires 24' knotted at 23 are shown in position for subsequent use on the next cable pattern to be assembled. Another set of wires is then drawn from supply board 20 and secured at starting point 14. Each individual wire is then strung along path 16, bent around its breakout point 18 and terminated at its respective termination point 15. This second set of wires, after assembly, is then tied to keep them together and dropped back to supply board 20. Each succeeding set of wires is likewise handled until all of the wires have been secured in place. Such precision cables may have on the order of twenty individual wires and terminals.

Once all the wires are assembled on the assembly device 10, they are bound together at various points along common cable path 16. Binding is generally accomplished by the use of a manually actuated "tie-gun". The tie-gun secures the individual wires of the cable together with a plastic strap. Other tie-guns are available, but some tie-guns tend to be large and unwieldy when used along the vertical lengths of cable. Once tied, the cable is removed from assembly device 10 and, but for the addition of connectors, is ready for use.

It should be noted that only after each individual cable has been completed is a subsequent cable then started. Each step performed for the prior cable must be repeated again, start to finish, for the next succeeding cable.

SUMMARY OF THE INVENTION

It is a principle object of my invention to provide a method of assembling precision, bent, electrical cables which substantially reduces the amount of assembly labor per cable.

In accordance with this objective, I assemble the cable in a substantially linear configuration but with a sufficient amount of additional length, or slack, adjacent bend points to permit subsequent bending of the cable after assembly without adversely affecting the precise location of the individual terminal points of the wire leads. Greater amounts of slack are preferably provided to those wires furthest from the inside of each bend.

An important labor savings feature of assembling the cable in this fashion is that it facilitates the use of tie-guns by eliminating the need to work on vertical portions of the cables during assembly.

Also in accordance with the principal object of my invention is my method of simultaneously assembling a plurality of cables at a time. According to my method, a plurality of substantially identical patterns corresponding to a plurality of substantially identical cables are positioned in a location accessible to the assembler. Then, instead of tying and dropping each wire or a group of wires after they are secured to these terminal points, the assembler holds the wire or wires after cutting and proceeds to the next pattern. This further substantially increases the assembler's efficiency.

This method could be used even with bent cables, if the cables are sufficiently small or if multiple cable assembly boards or the like are used. However, the assembly of the cables in a substantially linear form is particularly well adapted for use in this method and can be done on a single board.

Thus, one of the objectives of my invention is to provide an assembly device with a plurality of cable patterns to facilitate straight line cable assembly.

BRIEF DESCRIPTION OF THE DRAWINGS

The foregoing objectives, features and advantages will be explained in greater detail and further features and advantages will be made apparent from the following description of the preferred embodiment given with reference to the several views in the drawings in which.

DESCRIPTION OF THE PREFERRED EMBODIMENT

Figure 1A:
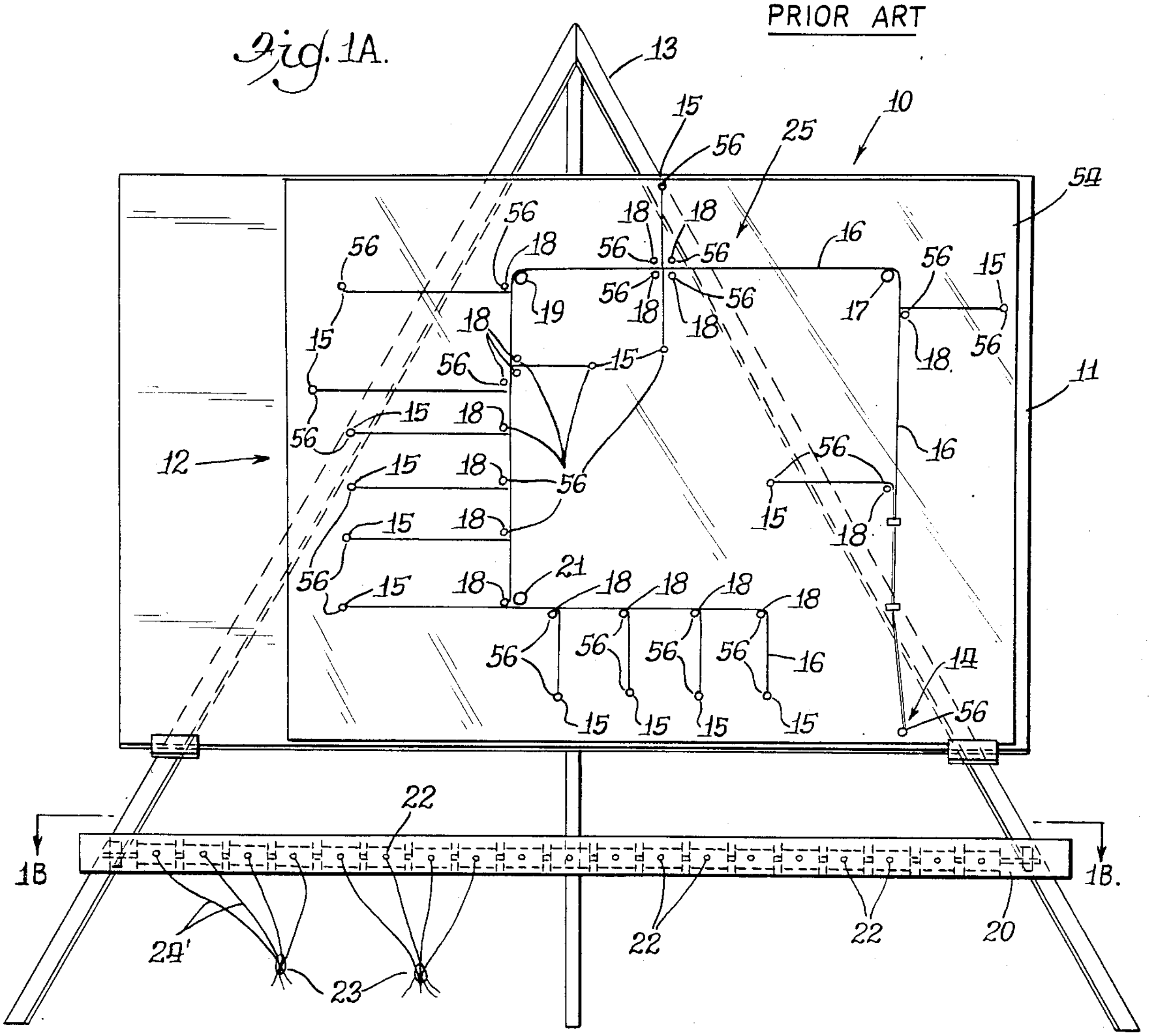
PRIOR ART Fig. 1A.
FIG. 1A is a front view of the prior art assembly device and pattern.
Figure 1B:
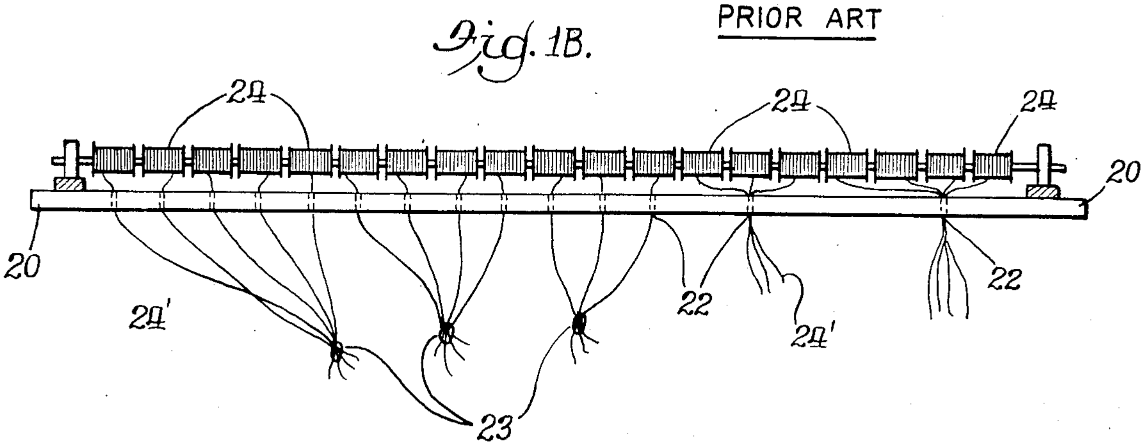
PRIOR ART Fig. 1B.
FIG. 1B is a top view of the wire supply board taken along line 1*b*—1*b* of FIG. 1A.
Figure 2:
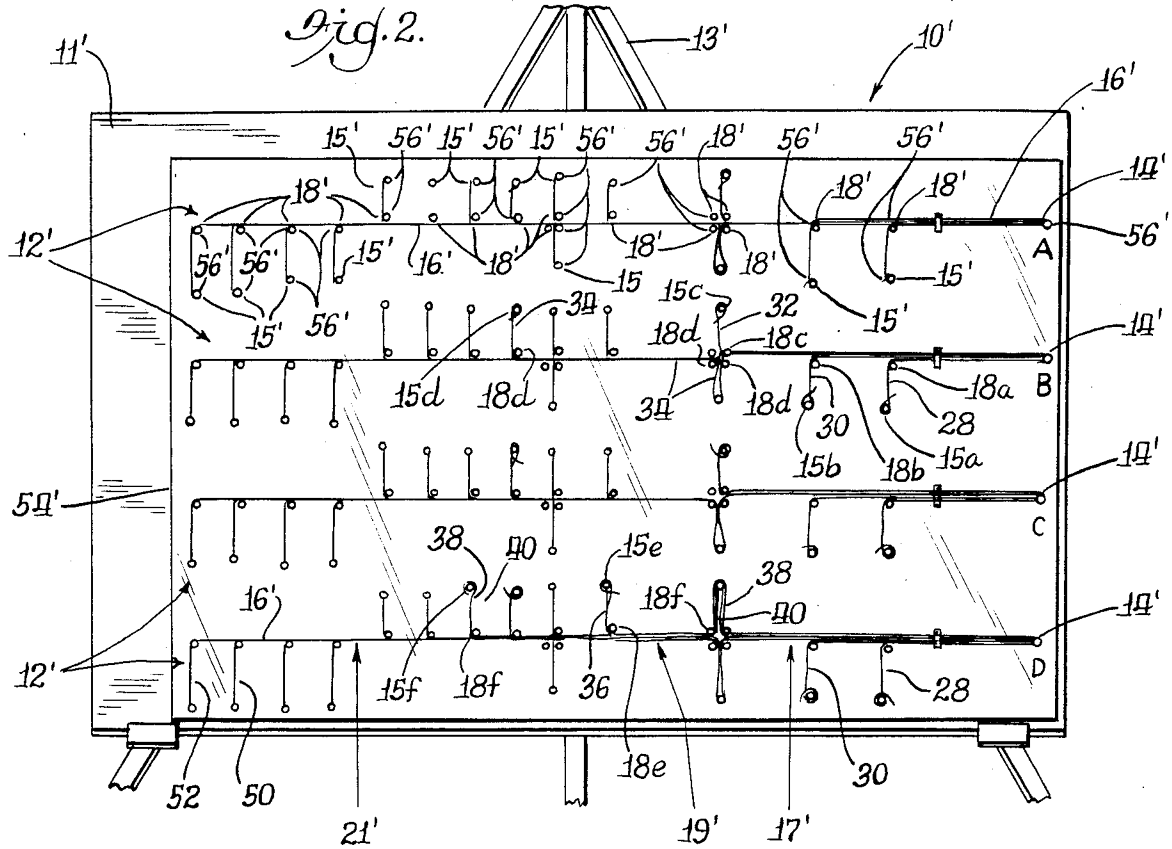
FIG. 2 shows the assembly apparatus and cable patterns of my invention, each pattern having a partially assembled cable thereon.

Referring to FIG. 2, it is seen that the basic components of my cable assembly apparatus 10′ are substantially the same as those described with reference to the prior art device of FIGS. 1A and 1B. Components of apparatus 10′ which correspond to like components of the old device of FIGS. 1A and 1B have therefore been given the same reference number with a superscript. These components are constructed the same and perform the same function as their correspondingly numbered components as described above with reference to FIGS. 1A and 1B unless otherwise indicated here.

The principal difference of an apparatus 10′ compared to that of FIG. 1A is that the board 11′ has wire retainers 56′ arranged in four substantially identical wiring patterns A, B, C and D. Each of these patterns A–D is used to assemble a cable the same as that type formed with the single pattern of FIG. 1A. However, as will be explained in greater detail below, my apparatus 10′ enables an assembler to simultaneously assemble a plurality of such cables here shown as four, instead of only one with a consequent substantial increase in efficiency.

Another important difference of my apparatus as seen in FIG. 2, is that each of the cable paths 16′ is substantially horizontal. Because of this, some tie-guns may be used with greater ease since the vertical cable portions are eliminated. In addition, the use of linear paths 16′ facilitate compact mounting of a plurality of such patterns on a single board, so that a single assembler can operate on all cables at once without the need for additional boards.

My cable assembly apparatus of FIG. 2 is used as follows. First, the assembler mounts the wire retainers to board 11′ in plural selected cable patterns A, B, C and D in accordance with the paper pattern 54′. Then the assembler selects a first group, or set of wires (generally four or five, determined by convenience) from the wire supply board 20 (shown only in FIGS. 1A and 1B).

The assembler then selects one of the patterns A, B, C and D, to begin assembly work on. Presuming pattern B and four wires are selected, the first wire 28 is strung from starting point 14′, around breakout point 18*a* and secured at termination point 15*a*. Wire 28 is then secured at point 15*a* by looping it around the wire retainer 56′ at point 15*a*. Likewise, as each additional wire is strung on the patterns, it is secured by looping it around its respective termination point. The second wire 30 of the first set is strung from starting point 14′, along a portion of path 16′, and around bend point 18*b*. Wire 30 is then secured to termination point 15*b*. Next, the third wire 32 is strung from starting point 14′, along path 16′, and around breakout point 18*c* and then secured to termination point 15*c*. Finally, the fourth wire 34 is strung from starting point 14′, along path 16′, and around breakout points 18*d*. Wire 34 is then secured at termination point 15*d*.

The fourth wire completes the assembly steps for the first set of wires to be placed along path 16′ of pattern B. Preferably at this time the four wires 28, 30, 32 and 34 are cut at their respective termination points. Alternately, each wire may be cut immediately after it is secured at its termination point instead of waiting until wires of the group are assembled.

According to the old method, the assembler would tie the ends of the group of wires together at this time, return the group to the supply board 20, and select the next group. According to my invention, however, the assembler does not return the group of wires but rather begins assembly of another cable on board 11′ on another one of the patterns with the same group of wires. Since pattern B was used as the first assembly cable, the operator may next choose to assemble on pattern C. The assembler repeats the steps just conducted on pattern B, for pattern C. When finished with pattern C, the assembler proceeds to assemble the same group of wires for each remaining cable pattern on board 11′, patterns A and D in this instance.

Only after the first set of wires has been connected to all patterns A through D, are they returned to the supply board 20. A second set of wires is then drawn from supply board 20. Each individual wire is then strung from starting point 14′ through to its termination point. Pattern D on assembly board 11′illustrates the second set of wires strung thereon. Wire 36 is then bent around wire retainer 56′ at breakout point 18*e* and secured at termination point 15*e*. Termination point 15*f* has wires 38 and 40 secured thereat. Wires 38 and 40 are then bent around breakout point 18*f* and secured at termination point 15*c*. When the wires of the second set have been strung along path 16′ of pattern D, they will be strung in a similar fashion along the paths of the remaining points shown on device 10′. Once assembled on each pattern, the individual wires are cut and secured to the staring point of the next pattern.

Succeeding sets of wires are similarly strung across patterns A through D until all of the wires desired to be assembled have been properly mounted and secured at their various termination points and cut. Thus, four precision wire cables are completed simultaneously.

Figure 3:
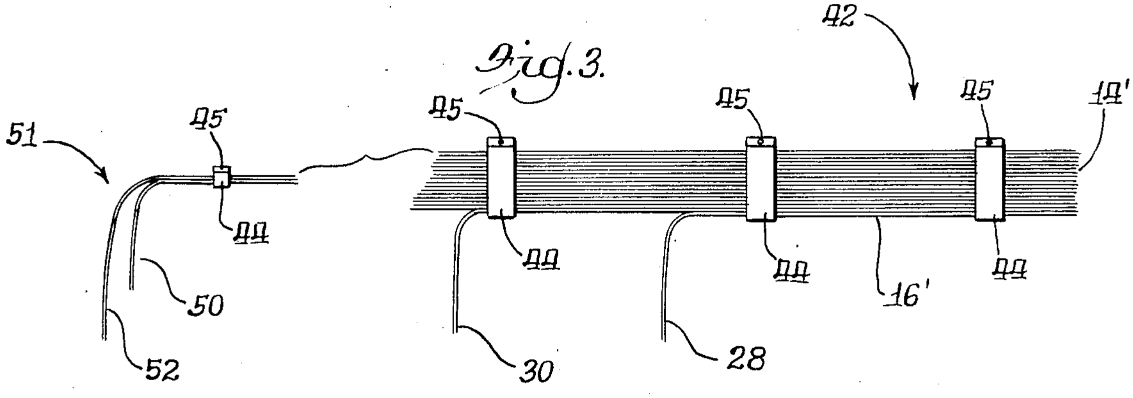
FIG. 3 illustrates a portion of a completed cable assembly.
Figure 4:
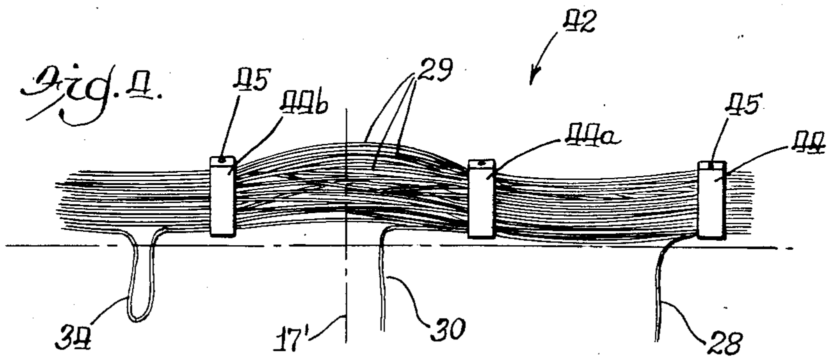
FIG. 4 illustrates a portion of the completed cable assembly showing a selected amount of slack retained between the cable bindings.

FIGS. 3 and 4 illustrate sections of assembled cable 42. As seen, point 14′ is the common starting point for all wires in cable assembly 42. The ties 44 located at various positions along path 16′ of cable 42 are plastic straps with appropriate locking portions 45. Of this particular assembly, wires 28 and 30 are shown at their breakout points. Very little slack or extra length is shown in FIG. 3, since no cable bends are contemplated along these sections.

Finished cable 42 is shown in section in FIG. 3. At end 51 wires 50 and 52 are the only wires in cable 42 since all other wires had breakout points intermediate the ends of the cable. Thus, as one progresses down the length of cable 42—from staring point 14′ to end 51, the cable diameter decreases. This mandates a lesser degree of slack or extra length necessary per wire at cable bend point 21′ than at bend points 17′ and 19′.

FIG. 4 illustrates slack 29 between the bindings 44 to facilitate the subsequent bending of cable 42 at cable bend point 17′. With a proper amount of added slack 29, the subsequent bending of cable 42 will cause a minimum amount of movement of the cable wires of cable 42.

While slack 29 may be placed in the other sections of cable 42, if a cable assembly with a greater degree of flexibility as to its subsequent use after manufacture is desired, it is preferably confined to only anticipated cable bend points, such as bend points 17', 19' and 21'. Preferably, the cable is bound from right to left. The wires are pulled tight from starting point 14' up to the section of anticipated bend, such as cable bend point 17'. A tie 44a is then placed at this point. Another tie 44b is then placed to the left of cable bend point 17', without tightening the wires from tie 44a to leave a degree of slack between ties 44a and 44b to accommodate the anticipated bend at point 17'.

When employing substantially linear cable paths to make precision bent cables, I find it necessary to introduce a selected amount of extra length, or slack to at least some of the wires adjacent the locations 17', 19' and 21' where the bends will be subsequently formed. A varying amount of slack may be provided to each wire depending on its location with respect to the other wires of the cable.

After all the wires have been assembled along paths 16' of each pattern, they are bound together at various points along their lengths, particularly just before each breakout point 18'. A tie-gun is used to bind the cables at the various points. Unlike the past method in which the tie-gun had to be prepared for use, used and then set aside after each individual cable, the tie-gun is used on all four cables before being set aside and the step of assembling the next group of cables begins. Preferably the gun is moved horizontally along each cable pattern on board 11' in succession. Because there are no vertical runs to the cable paths, the tie gun may be used more easily.

The cables are then removed from board 11' and connectors added for connection to an electronic device such as a pinball machine (not shown). At the point of connection with the electronic device, or prior thereto, the cable is bent from its generally linear assembly form into the bent form of utilization such as illustrated by pattern 12 of FIG. 1A.

While the foregoing is a description of my invention in its preferred embodiment, other variations are contemplated. For example, multiple boards may be employed for simultaneously making a plurality of cables. Also, the retainers need not necessarily be nail-like members.

I claim:

1. A method of assembling an insulated wire cable of selected configuration, comprising the steps of:

(a) stringing a plurality of wires between a starting point and a finishing point for each wire along a path that is common for at least a portion of at least some of said wires, said common path being a substantially linear path;

(b) providing a selected amount of extra length in at least some of the individual wires from their starting points to their finishing points;

(c) binding the wires together at selected points along said common path;

(d) bending the bound wires into the selected configuration;

(e) binding said extra length between bindings on opposite sides of the bends; and (f) greater amounts of extra length being selected for those wires located increasingly closer to the outside of the bends.

2. A method of assembling a plural number of insulated wire cables by repetitively applying each step of the method of claim 1 said plural number of times in succession until said plural number of cables have been assembled.

3. The method of claim 2 in which said plurality of wires comprise a plurality of selected groups of wires and each group of wires is repetitively strung said plural number of times before the next group of wires is strung.

4. A device for simultaneously assembling a plurality of insulated wire cables comprising:

(a) a board member;

(b) means defining a plurality of substantially identical cable paths disposed on said board member;

(c) pin-like retaining means mounted to said board member at intermittent widely spaced positions along said cable paths for securing individual wires of different lengths along each of said cable paths;

(d) each of said paths being a substantially linear path; and (e) said paths being disposed in a vertical array and substantially parallel to each other whereby a cable assembler may manually grasp and secure wires to said cable paths proceeding from one cable path to another on the same board to produce sequentially a plurality of cable assemblies.

5. The device of claim 4 wherein each of said paths are substantially horizontal.

6. The device of claim 4 wherein said retaining means comprises a series of elongate members extending outwardly away from the frame located along each of the paths.

7. The device of claim 4 including means for designating various termination points for said individual wires for each of said plural paths.

8. The device of claim 7 wherein said designation means is a printed paper pattern containing terminal information for each of said plural paths.

9. The device of claim 4 in which there are at least three substantially identical paths thereon.

* * * * *